(12) United States Patent
de Montmorillon et al.

(10) Patent No.: US 7,587,111 B2
(45) Date of Patent: Sep. 8, 2009

(54) SINGLE-MODE OPTICAL FIBER

(75) Inventors: Louis-Anne de Montmorillon, Versailles (FR); Denis Molin, Draveil (FR); Pieter Matthijsse, Hapert (NL); Frans Gooijer, Eindhoven (NL); Emmanuel Petitfrere, Villeneuve D'Ascq (FR); Yves Lumineau, Herblay (FR); Franciscus Johannes Achten, Tilburg (NL); Marianne Bigot-Astruc, Le Chesnay (FR); Pierre Sillard, Le Chesnay (FR); Pascale Nouchi, Ville D'Avray (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/697,994

(22) Filed: Apr. 9, 2007

(65) Prior Publication Data

US 2007/0280615 A1    Dec. 6, 2007

(30) Foreign Application Priority Data

Apr. 10, 2006   (FR) .................................. 06 03128

(51) Int. Cl.
G02B 6/36    (2006.01)
(52) U.S. Cl. ..................................... 385/127
(58) Field of Classification Search ........................ None
See application file for complete search history.

(56) References Cited

U.S. PATENT DOCUMENTS

RE30,635 E    6/1981   Kuppers et al.
4,314,833 A   2/1982   Kuppers
4,641,917 A   2/1987   Glodis et al.
4,836,640 A   6/1989   Gartside, III et al.
4,838,643 A   6/1989   Hodges et al.
4,852,968 A   8/1989   Reed
5,032,001 A   7/1991   Shang
5,175,785 A   12/1992  Dabby
5,235,660 A   8/1993   Perry et al.
5,448,674 A   9/1995   Vengsarkar et al.
5,555,340 A   9/1996   Onishi et al.
5,586,205 A   12/1996  Chen et al.
5,673,354 A   9/1997   Akasaka et al.
5,721,800 A   2/1998   Kato et al.
5,802,236 A   9/1998   DiGiovanni et al.
5,852,690 A   12/1998  Haggans et al.
5,917,109 A   6/1999   Berkey
5,946,439 A   8/1999   Terasawa et al.

(Continued)

FOREIGN PATENT DOCUMENTS

DE            3700565 A1      7/1988

(Continued)

OTHER PUBLICATIONS

I. Sakabe et al., "Enhanced Bending Loss Insensitive Fiber and New Cables for CWDM Access Networks", Proceeding 53rd IWCS, pp. 112-118, (2004).

(Continued)

*Primary Examiner*—Omar Rojas
(74) *Attorney, Agent, or Firm*—Summa, Additon & Ashe, P.A.

(57) ABSTRACT

Disclosed is an optical transmission fiber having reduced bending and microbending losses that is commercially usable in FTTH or FTTC transmission systems.

19 Claims, 4 Drawing Sheets

U.S. PATENT DOCUMENTS

| | | |
|---|---|---|
| 5,963,700 A | 10/1999 | Kato et al. |
| 5,966,490 A | 10/1999 | Minns et al. |
| 6,181,858 B1 | 1/2001 | Kato et al. |
| 6,185,353 B1 | 2/2001 | Yamashita et al. |
| 6,266,467 B1 | 7/2001 | Kato et al. |
| 6,317,551 B1 | 11/2001 | Mitchell et al. |
| 6,334,019 B1 | 12/2001 | Birks et al. |
| 6,360,046 B1 | 3/2002 | Sasaoka et al. |
| 6,396,987 B1 | 5/2002 | de Montmorillon et al. |
| 6,415,089 B2 | 7/2002 | Kato et al. |
| 6,422,042 B1 | 7/2002 | Berkey |
| 6,424,776 B1 | 7/2002 | Nouchi et al. |
| 6,466,721 B1 | 10/2002 | Tsukitani et al. |
| 6,477,305 B1 | 11/2002 | Berkey et al. |
| 6,490,396 B1 | 12/2002 | Smith |
| 6,510,268 B1 | 1/2003 | de Montmorillon et al. |
| 6,529,666 B1 | 3/2003 | Dultz et al. |
| 6,530,244 B1 | 3/2003 | Oh et al. |
| 6,535,676 B1 | 3/2003 | de Montmorillon et al. |
| 6,603,913 B1 | 8/2003 | Okuno |
| 6,647,190 B2 | 11/2003 | Matsuo et al. |
| 6,650,814 B2 | 11/2003 | Caplen et al. |
| 6,658,190 B2 | 12/2003 | Hirano et al. |
| 6,671,442 B2 | 12/2003 | Wang et al. |
| 6,687,445 B2 | 2/2004 | Carter et al. |
| 6,744,959 B2 | 6/2004 | Takahashi |
| 6,771,865 B2 | 8/2004 | Blaszyk et al. |
| 6,804,441 B2 | 10/2004 | Arai et al. |
| 6,819,848 B2 | 11/2004 | Takahashi |
| 6,856,744 B2 | 2/2005 | Kumano |
| 6,859,599 B2 | 2/2005 | Mukasa |
| 6,885,802 B2 | 4/2005 | Oliveti et al. |
| 6,901,196 B2 | 5/2005 | Takahashi et al. |
| 6,904,772 B2 | 6/2005 | Berkey et al. |
| 6,917,740 B2 | 7/2005 | Boek et al. |
| 6,917,743 B2 | 7/2005 | Honma et al. |
| 6,928,211 B2 | 8/2005 | Tanigawa et al. |
| 6,959,137 B2 | 10/2005 | Kalish et al. |
| 6,985,662 B2 | 1/2006 | Bickham |
| 7,072,552 B2 | 7/2006 | Manyam et al. |
| 7,164,835 B2 | 1/2007 | Matsuo et al. |
| 7,171,090 B2 | 1/2007 | Mattingly, III et al. |
| 7,187,833 B2 | 3/2007 | Mishra |
| 7,254,305 B2 | 8/2007 | Mishra |
| 7,272,289 B2 | 9/2007 | Bickham et al. |
| 7,283,714 B1 | 10/2007 | Gapontsev et al. |
| 7,295,741 B2 | 11/2007 | Sako et al. |
| 7,356,234 B2 | 4/2008 | de Montmorillon et al. |
| 7,366,386 B2 | 4/2008 | Sako et al. |
| 7,366,387 B2 | 4/2008 | Matsuo et al. |
| 7,450,807 B2 | 11/2008 | Bickham et al. |
| 7,505,660 B2 | 3/2009 | Bickham et al. |
| 2002/0031317 A1 | 3/2002 | Tsukitani et al. |
| 2002/0061175 A1 | 5/2002 | Matsuo et al. |
| 2002/0122644 A1 | 9/2002 | Birks et al. |
| 2003/0081921 A1 | 5/2003 | Sillard et al. |
| 2003/0152349 A1 | 8/2003 | Lauzon et al. |
| 2003/0190128 A1 | 10/2003 | Jang et al. |
| 2003/0210878 A1 | 11/2003 | Kumano et al. |
| 2003/0223717 A1 | 12/2003 | Blaszyk et al. |
| 2003/0231847 A1 | 12/2003 | Varner et al. |
| 2004/0031288 A1 | 2/2004 | Blinov |
| 2004/0033039 A1 | 2/2004 | Oliveti et al. |
| 2004/0086245 A1 | 5/2004 | Farroni et al. |
| 2004/0197063 A1 | 10/2004 | Changdar et al. |
| 2005/0244120 A1 | 11/2005 | Mishra |
| 2006/0115224 A1 | 6/2006 | Kutami et al. |
| 2006/0140560 A1 | 6/2006 | Allen et al. |
| 2007/0003198 A1 | 1/2007 | Gibson et al. |
| 2007/0003199 A1 | 1/2007 | Mattingly et al. |
| 2007/0053642 A1 | 3/2007 | Mishra |
| 2007/0104437 A1 | 5/2007 | Bookbinder et al. |
| 2007/0127878 A1 | 6/2007 | de montmorillon et al. |
| 2007/0147756 A1 | 6/2007 | Matsuo et al. |
| 2007/0196061 A1 | 8/2007 | Bickham et al. |
| 2007/0258686 A1 | 11/2007 | de Montmorillon et al. |
| 2007/0280615 A1 | 12/2007 | de Montmorillon et al. |
| 2008/0013905 A1 | 1/2008 | Bookbinder et al. |
| 2008/0056654 A1 | 3/2008 | Bickham et al. |
| 2008/0056658 A1 | 3/2008 | Bickham et al. |
| 2008/0124028 A1 | 5/2008 | Bickham et al. |
| 2008/0226241 A1 | 9/2008 | Sugizaki et al. |

FOREIGN PATENT DOCUMENTS

| | | |
|---|---|---|
| EP | 0059564 A1 | 9/1982 |
| EP | 0327702 A2 | 8/1989 |
| EP | 0848266 A1 | 6/1998 |
| EP | 0991967 A1 | 4/2000 |
| EP | 1195628 A1 | 4/2002 |
| EP | 1398653 A1 | 3/2004 |
| EP | 1443347 A2 | 8/2004 |
| EP | 1698920 A1 | 9/2006 |
| EP | 1785754 A1 | 5/2007 |
| EP | 1845399 A1 | 10/2007 |
| GB | 2228585 A | 8/1990 |
| WO | 99/00685 A1 | 1/1999 |
| WO | 00/14580 A1 | 3/2000 |
| WO | 01/27667 A2 | 4/2001 |
| WO | 01/47822 A1 | 7/2001 |
| WO | 02/12931 A2 | 2/2002 |
| WO | 2002012931 A2 | 2/2002 |
| WO | 02/29459 A1 | 4/2002 |
| WO | 2002039159 A1 | 5/2002 |
| WO | 2003107054 A1 | 12/2003 |
| WO | 2004/092794 A1 | 10/2004 |
| WO | 2004109352 A1 | 12/2004 |
| WO | 2008027351 A2 | 3/2008 |

OTHER PUBLICATIONS

T. Yokokawa et al., "Ultra-Low Loss and Bend Insensitive Pure-Silica-Core Fiber Complying with G.652 C/D and its Applications to a Loose Tube Cable", Proceedings 53rd IWCS, pp. 150-155, (2004).

S. Matsuo et al., "Low-Bending-Loss and Low-Splice-Loss Single-Mode Fibers Employing a Trench Index Profile", Journal of Lightwave Technology, Vo. 23 n. 11, pp. 3494-3499, (2005).

K. Himeno et al., "Low-Bending-Loss Single Mode Fibers for Fiber-To-The Home", Journal of Lightwave Technology, vol. 23, No. 11, pp. 3494-3499, (2005).

K. Bandou et al., "Development of Premise Optical Wiring Components Using Hole-Assisted Fiber", Proceedings 53rd IWCS, pp. 119-122, (2004).

T. Hasegawa et al., "Bend-Insensitive Single-Mode Holey Fiber with SMF-Compatibility for Optical Wiring Applications", Proceedings ECOC'03, paper We2.7.3, Rimini, Italy, (2003).

D. Nishioka et al., "Development of Holey Fiber Supporting Extra-Small Diameter Bending," SEI Technical Review, No. 58, pp. 42-47, (2004).

K. Miyake et al., "Vend Resistant Photonic Crystal Fiber Compatible with Conventional Single Mode Fiber," Proceedings ECOC'04, paper Mo3.3.4, Stockholm, Sweden, (2004).

Y. Tsuchida et al., "Design and Characterization of Single-Mode Holey Fiber with Low Bending Losses", Optics Express, vol. 13, No. 12, pp. 4470-4479, (2005).

K. Ohsono et al., "Hight Performance Optical Fibers for Next Generation Transmission Systems," Hitachi Cable Review, No. 22, pp. 1-5, (2003).

K. Nakajima et al., "Hole-Assisted Fiber Design for Small Bending and Splice Loss," IEEE Photonics Technology Letters, vol. 15, No. 12, pp. 1737-1739, (2003).

K. Ieda et al., "Transmission Characteristics of a Hole-Assisted Fiber Cord for Flexible Optical Wiring," Proceedings 54th IWCS, pp. 63-68, (2005).

N. Guan et al., "Hole-Assisted Single Mode Fibers for Low Bending Loss," Proceedings ECOC'04, paper M03.3.5, Stockholm, Sweden, (2004).

European Search Report and Written Opinion for corresponding European Application No. 07006909, dated Jul. 7, 2007.

French Search Report and Written Opinion for corresponding French Application No. 0603128, dated Jul. 20, 2006.

European Search Report in commonly owned European Patent Application No. 06076957, dated Jan. 26, 2007.

European Office Action in commonly owned European Patent Application No. 06076957, dated Nov. 2, 2007.

Matsuo et al., "Bend-Insensitive and Low Splice-Loss Optical Fiber for Indoor Wiring in FTTH", OFC'04 Proceedings, paper Th13 (2004).

Unger et al., "Low-loss Single mode Fibre with reduced inner cladding", OFC 1987 Post deadline paper.

Matsuo et al., "Low-Bending-Loss and Low-Splice-Loss Single-Mode Fibers Employing a Trench Index Profile", IEICE Trans. Electron., vol. E88-C, No. 5, pp. 889-895, May 2005.

De Montmorillon et al., "Bend-Optimized G.652D Compatible Trench-Assisted Single Mode Fibers", IWCS, Proceedings of the 55th IWCS/Focus, pp. 342-347, Providence, RI, (Nov. 2006).

U.S. Appl. No. 11/800,161 filed on May 04, 2007, "Microstructured Transmission Optical Fiber"; Now U.S. Patent No. 7,505,660 (Corning, Inc.).

U.S. Appl. No. 60/879,702 filed on Jan. 10, 2007 (Corning, Inc.).

U.S. Appl. No. 60/861,776 filed on Nov. 29, 2006 (Corning, Inc.).

U.S. Appl. No. 60/841,490 filed on Aug. 31, 2006 (Corning, Inc.).

U.S. Appl. No. 11/888,959 filed on Aug. 3, 2007 (Corning, Inc.).

U.S. Appl. No. 60/841,458 filed on Aug. 31, 2006 (Corning, Inc.).

U.S. Appl. No. 11/888,958 filed on Aug. 3, 2007 (Corning, Inc.).

Matsuo et al., "Low-Bending-Loss and Low-Splice-Loss Single-Mode Fibers Employing a Trench Index Profile", IEICE Trans. Electron., vol. E88-C, No. 5, pp. 889-895, May 2005.

Jeunhomme, "Single-Mode Fiber Optics, Principles and Applications, Second Edition, Revised and Expanded", pp. 38-49, 1989.

Allard, et al., "Bending loss of a single-mode triangular-index fiber with a depressed cladding ring by a vector mode method", SPIE vol. 1792 (1992), 66. 146-155.

Allard, et al., "Bending-loss studies of a single-mode triangular-index fiber with a depressed cladding ring with a vector-mode method", Applied Optics, vol. 33, No. 33, Nov. 20, 1994, pp. 7725-7732.

Yip, et al, "Dispersion Studies of a Single-Mode Triangular-Core Fiber with a Trench by the Vector Mode Analysis", 1989 IEEE MTT-S Digest, pp. 1175-1178.

Yip et al., "Dispersion studies of a single-mode triangular-index fiber with a trench by the vector mode analysis", Applied Optics, vol. 29, No. 36, Dec. 20, 1990, pp. 5343-5352.

Bing et al., "Low-loss Holey Fiber", Hitachi Cable Review No. 24, Aug. 2005, pp. 1-5.

10 – fiber

11 – central core

12 – first intermediate inner cladding

13 – first depressed inner cladding

14 – second intermediate inner cladding

15 – second depressed inner cladding

16 – outer cladding (refractive index $n_g$)

SINGLE-MODE OPTICAL FIBER

CROSS-REFERENCE TO PRIORITY APPLICATIONS

This application hereby claims the benefit of pending French Application No. 06/03128 (filed Apr. 10, 2006 at the French Patent Office), which is hereby incorporated by reference in its entirety.

FIELD OF THE INVENTION

The present invention relates to the field of transmissions through optical fiber and more specifically to a line fiber having reduced bending and microbending losses.

BACKGROUND OF THE INVENTION

For optical fibers, the index profile is generally described as the graphical appearance of the function that associates the refractive index with the radius of the fiber. Conventionally, the distance (r) to the center of the fiber is represented on the abscissa and the difference between the refractive index and the refractive index of the fiber cladding is represented on the ordinate. The index profile is thereby termed as a "step," "trapezium," or "triangle" for graphs that have the shapes of a step, a trapezium, or a triangle, respectively. These curves are generally representative of the theoretical or set profile of the fiber. Constraints in manufacturing the fiber, however, may lead to a slightly different profile.

An optical fiber conventionally includes an optical core, which has the purpose of transmitting and possibly amplifying an optical signal, and an outer optical cladding, which has the purpose of confining the optical signal in the core. Accordingly, the refractive index of the core ($n_c$) is greater than the refractive index of the outer optical cladding ($n_g$) (i.e., $n_c > n_g$). As is well known, propagation of an optical signal in a single-mode optical fiber is broken down into (i) a fundamental guided mode in the core and (ii) secondary modes guided over a certain distance in the core-cladding assembly, called cladding modes.

Conventionally, step-index fibers, also called single mode fibers (SMFs), are used as a line fiber for transmission systems with optical fibers. These fibers exhibit chromatic dispersion and a chromatic dispersion slope meeting specific telecommunications standards.

For requirements of compatibility between optical systems from different manufacturers, the International Telecommunication Union (ITU) defined a standard with a specification referenced as ITU-T G.652, with which an optical fiber for standard transmission (i.e., a standard single mode fiber or SSMF) should comply.

This specification G.652 recommends, among other things, that for a transmission fiber, the range [8.6-9.5 µm] for the value of the mode field diameter (MFD), at a wavelength of 1310 nm; a maximum of 1260 nm for the value of the cable cut-off wavelength; the range [1300-1324 nm] for the zero dispersion wavelength, noted as $\lambda_0$; a maximum of 0.092 ps/nm²-km for the value of the chromatic dispersion slope. The cable cut-off wavelength is conventionally measured as the wavelength at which the optical signal is no longer single mode after propagation over 22 meters of fiber, such as defined by the subcommittee 86A of the International Electrotechnical Commission in the IEC 60793-1-44 standard.

Moreover, for a given fiber, a so-called MAC value is defined as the ratio of the mode field diameter of the fiber at 1550 nm) and the effective cut-off wavelength ($\lambda_{Ceff}$). The effective cut-off wavelength is conventionally measured as the wavelength at which the optical signal is no longer single mode after propagation over two meters of fiber, as defined by the sub-committee 86A of the International Electrotechnical Commission in the IEC 60793-1-44 standard. MAC is a parameter for evaluating the fiber performance and is particularly useful for finding a compromise between the mode field diameter, the effective cut-off wavelength, and the bending losses.

FIG. 1 depicts experimental results that illustrate bending losses at a wavelength of 1625 nm with a bending radius of 15 mm in a step-index SSMF versus the value of MAC at the wavelength of 1550 nm. It is seen that the value of MAC influences the bending losses of the fiber and that these bending losses may be reduced by reducing MAC.

Now, a reduction in MAC, by reducing the mode field diameter and/or by increasing the effective cut-off wavelength, may lead away from the G.652 standard and make the fiber commercially incompatible with certain transmission systems.

Indeed, the value of the effective cut-off wavelength ($\lambda_{Ceff}$) cannot be increased beyond a limiting value in order to observe the maximum value of 1260 nm for the cable cut-off frequency ($\lambda_{CC}$). Furthermore, the value of the mode field diameter for a given wavelength is strictly imposed in order to minimize coupling losses between the fibers.

Reduction of the MAC criterion for limiting the bending losses should therefore be combined with a limitation of the value of the effective cut-off wavelength ($\lambda_{Ceff}$) in order to limit propagation of modes of higher orders in the fiber, while retaining a sufficient mode field diameter to provide coupling without excessive optical losses.

In particular, there is a trade-off between compliance with the G.652 standard and reduction of the bending losses for fibers intended for fiber optical systems up to the individual, so-called "fibers to the home" (FTTH) or fiber optical systems up to the curb or up to the building, so-called "fibers to the curb" (FTTC).

Indeed, a transmission system through optical fibers comprises storage boxes in which fiber overlengths are provided in the case of future interventions. These overlengths are wound in the boxes. Because of the intention to miniaturize these boxes for FTTH or FTTC applications, the single mode fibers in this context are intended to be wound on increasingly small diameters (so as to reach bending radii as small as 15 mm). Moreover, within the scope of FTTH or FTTC applications, the fiber risks being subject to harsher installation constraints than in applications at longer distances (i.e., the presence of accidental bendings related to the installation and to the environment). Provision must be made for the presence of accidental bending radii equal to 7.5 mm or even 5 mm. It is therefore absolutely necessary in order to meet the constraints related to the storage boxes and to the installation constraints that the single mode fibers used for FTTH or FTTC applications have limited bending losses. Nevertheless it is understood that this reduction in bending losses should not be achieved to the detriment of a loss of the single mode character of the signal. This would strongly deteriorate the signal or detrimentally introduce significant junction optical losses.

U.S. Pat. No. 4,852,968 (Reed et al.) relates to a single mode optical fiber having an index profile consisting of a core region, a first cladding region, a trench region, and a second cladding region and, optionally, a second trench region. This patent further relates to the optimization of dispersion characteristics.

In order to obtain optical fibers that meet the requirement for a reduction of bending losses, three kinds of solutions have been proposed in the prior art.

A first solution found in the prior art consists of producing conventional step-index fibers with a reduced mode field diameter. The bending losses are indeed reduced by decreasing MAC because of the reduction in mode field diameter, and a single mode character is retained with a cable cut-off wavelength, which remains less than 1260 nm. Nevertheless, such fibers have significant coupling losses and are not adapted to the FTTH applications described previously.

The publication of I. Sakabe et al., "Enhanced Bending Loss Insensitive Fiber and New Cables for CWDM Access Networks", Proceeding 53$^{rd}$ IWCS, pp. 112-118 (2004), suggests reducing the mode field diameter of the fiber in order to reduce the bending losses. This reduction in mode field diameter, however, leads away from the G.652 standard.

The publication of T. Yokokawa et al., "Ultra-Low Loss and Bend Insensitive Pure-Silica-Core Fiber Complying with G.652 C/D and its Applications to a Loose Tube Cable," Proceedings 53$^{rd}$ IWCS, pp. 150-155 (2004), proposes a pure silica core fiber (PSCF) having reduced transmission and bending losses, but with a reduced mode field diameter that is located outside the G.652 standard.

A second solution found in the prior art consists of producing step-index fibers with a depressed section (i.e., a central core, an intermediate cladding, and a depressed cladding). With such a structure, it is possible to actually reduce the bending losses with constant MAC for small bending radii, typically 10 mm.

The publications of S. Matsuo et al., "Low-Bending-Loss and Low-Splice-Loss Single-Mode Fibers Employing a Trench Index Profile," *Journal of Lightwave Technology*, Vol. 23 no. 11, pp. 3494-3499 (2005), and K. Himeno et al., "Low-Bending-Loss Single Mode Fibers For Fiber-To-The Home," *Journal of Lightwave Technology*, Vol. 23, No. 11, pp. 3494-3499, (2005), propose such fiber structures with depressed section in order to reduce the bending losses.

Analyses, however, demonstrate that if the bending losses may be substantially improved with a fiber profile with depressed sections, such a profile also causes an increase in the effective cut-off wavelength by the occurrence of resistant leakage modes, which mainly propagate in the intermediate cladding and the depressed section.

Consequently, this requires that fibers having a MAC less than 7.9 at 1550 nm be selected in order to compensate the fact that the effective cut-off wavelength is much higher than expected while guaranteeing bending losses at 1625 nm less than 0.1 dB/turn for a winding with a radius of 15 mm; whereas for a SSMF, it is sufficient to select fibers with a MAC less than 8.1 at 1550 nm in order to guarantee losses less than 0.1 dB/turn at 1625 nm for a bending radius of 15 mm (from the results of FIG. 1). The manufacturing yield for such step-index fibers with a depressed section is therefore reduced.

A third solution found in the prior art consists of producing hole-assisted step-index fibers.

The publication of K. Bandou et al., "Development of Premise Optical Wiring Components Using Hole-Assisted Fiber," Proceedings 53$^{rd}$ IWCS, pp. 119-122 (2004), proposes a fiber with holes, the fiber having the optical characteristics of a step-index SSMF with reduced bending losses.

Such hole-assisted step-index fibers for reducing the bending losses have also been described in the publications of T. Hasegawa et al., "Bend-Insensitive Single-Mode Holey Fiber with SMF-Compatibility for Optical Wiring Applications," in Proceedings ECOC'03, paper We2.7.3, Rimini, Italy (2003); of D. Nishioka et al., "Development of Holey Fiber Supporting Extra-Small Diameter Bending," SEI Technical Review, No. 58, pp. 42-47 (2004); of K. Miyake et al., "Bend Resistant Photonic Crystal Fiber Compatible with Conventional Single Mode Fiber," in Proceedings ECOC'04, paper Mo3.3.4, Stockholm, Sweden (2004); of Y. Tsuchida et al., "Design and Characterization of Single-Mode Holey Fibers with Low Bending Losses", Optics Express, Vol. 13, No. 12, pp. 4470-4479 (2005); of K. Ohsono et al., "High Performance Optical Fibers for Next Generation Transmission Systems," Hitachi Cable Review, No. 22, pp. 1-5, (2003); of K. Nakajima et al., "Hole-Assisted Fiber Design for Small Bending and Splice Loss," IEEE Photonics Technology Letters, Vol. 15, No. 12, pp. 1737-1739, (2003); of K. Ieda et al., "Transmission Characteristics of a Hole-Assisted Fiber Cord for Flexible Optical Wiring," Proceedings 54$^{th}$ IWCS, pp. 63-68 (2005); of N. Guan et al., "Hole-Assisted Single Mode Fibers for Low Bending Loss," in Proceedings ECOC'04, paper Mo3.3.5, Stockholm, Sweden (2004), and of K. Himeno et al., "Low-Bending-Loss Single-Mode Fibers for Fiber-To-The-Home", Journal of Lightwave Technology, Vol. 23, No. 11, pp. 3494-3499 (2005).

The cost for manufacturing such a fiber and the presently high attenuation levels (>0.25 dB/km), however, make commercial use in FTTH or FTTC systems impractical. Further, with these fibers, it is simply not possible to achieve the optical characteristics recommended by the G.652 standard, notably in terms of chromatic dispersion.

Therefore, there is a need for a transmission fiber with which it is possible to meet the criteria of the G.652 standard (i.e., commercially usable in FTTH or FTTC transmission systems) and which has reduced bending and microbending losses. In particular, there is a need for a fiber that has reduced losses for a bending radius of 15 mm and also for a bending radius as small as 7.5 mm. Indeed, in FTTH applications, overlengths of fibers are generally wound in increasingly miniaturized storage boxes. Moreover, the fiber will be subject to significant bending stresses related to the environment of its installation.

SUMMARY OF THE INVENTION

Accordingly, the present invention proposes an optical fiber having a particular step-index profile with a first highly depressed section and a weakly depressed second section.

With such a structure, it is possible to effectively reduce the bending losses at constant MAC while strongly minimizing the leakage modes of a higher order. Thus, unlike the fibers from the prior art having a step-index structure with a depressed section, the fiber of the invention has a cable cut-off wavelength which remains less than 1260 nm. The fiber of the invention thus complies with the G.652 standard.

More particularly and as schematically depicted in FIG. 2, the invention proposes an optical transmission fiber 10 that includes: a central core 11 having an index difference ($Dn_1$) with an outer optical cladding 16; a first intermediate inner cladding 12 having an index difference ($Dn_2$) with the outer optical cladding 16; a first depressed inner cladding 13 having an index difference ($Dn_3$) with the outer optical cladding 16 that is less than or equal to $-5 \times 10^{-3}$; a second intermediate inner cladding 14 having an index difference ($Dn_4$) with the outer optical cladding 16; a second depressed inner cladding 15 having an index difference ($Dn_5$) with the outer optical cladding 16 that is inferior, in absolute value, to the index difference $Dn_3$ between the first depressed inner cladding 13 and the outer optical cladding 16; and wherein, for a wavelength of 1625 nm, the optical fiber 10 has bending losses less than or equal to 0.1 dB/10 turns for a bending radius of 15 mm and bending losses less than or equal to 0.5 dB/turn for a bending radius of 7.5 mm.

According to the exemplary embodiments of the present invention, the fiber may include one or more of the following characteristics: the index difference between the second depressed inner cladding and the outer optical cladding is between $-0.3 \times 10^{-3}$ and $-3 \times 10^{-3}$; the index difference between the central core and the first intermediate inner cladding is between $4.5 \times 10^{-3}$ and $6.0 \times 10^{-3}$; the central core has a radius between 3.5 μm and 4.5 μm for an index difference with the outer optical cladding between $5.0 \times 10^{-3}$ and $5.6 \times 10^{-3}$; the first intermediate inner cladding has a radius between 9 μm and 12 μm; the first depressed inner cladding has a radius between 14 μm and 16 μm; the second intermediate inner cladding has a substantially zero index difference with the outer optical cladding; the second intermediate inner cladding has a radius between 18 μm and 20 μm; the second depressed inner cladding has a radius between 25 μm and 40 μm; bending losses less than or equal to 0.1 dB/100 turns for a bending radius of 20 mm, at the wavelength of 1625 nm; bending losses less than or equal to 1 dB/turn for a bending radius of 5 mm, at the wavelength of 1625 nm; microbending losses, according to the so-called method of the fixed diameter drum ("touret à diamètre fixe"), less than or equal to 0.8 dB/km up to a wavelength of 1625 nm; a cable cut-off wavelength less than or equal to 1260 nm; a mode field diameter between 8.6 μm and 9.5 μm for a wavelength of 1310 nm; a ratio (MAC) of the mode field diameter of the fiber at 1550 nm over the effective cut-off wavelength ($\lambda_{Ceff}$) less than 8.2; a zero chromatic dispersion wavelength ($\lambda_0$) between 1300 nm and 1324 nm with a chromatic dispersion slope inferior or equal to 0.092 ps/nm²/km at this wavelength.

The invention also relates to an optical module including a housing in which is rolled up at least one fiber portion according to the invention; as well as to a storage box in which is wound at least a fiber portion according to the invention.

According to some embodiments, the fiber is rolled up with a bending radius less than 15 mm, and/or with a bending radius less than 7.5 mm.

The invention further relates to a "fiber to the home" (FTTH) or "fiber to the curb" (FTTC) optical system that includes at least an optical module or a storage box.

Other features and advantages of the invention will become apparent upon reading the following description of embodiments of the invention, given by way of example and with reference to the appended drawings, wherein:

DETAILED DESCRIPTION

Figure 1:
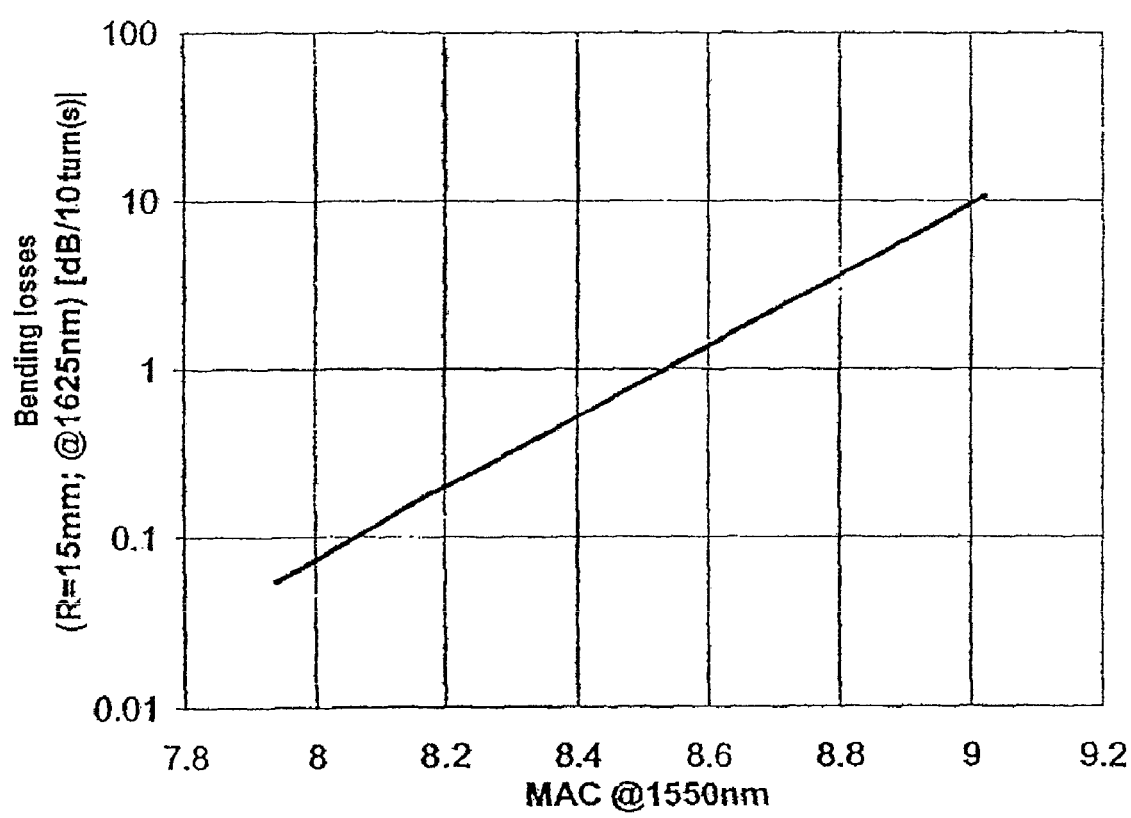
FIG. 1 depicts bending losses at a wavelength of 1625 nm with a bending radius of 15 mm in a standard step-index fiber versus the MAC value at the wavelength of 1550 nm.
Figure 2:
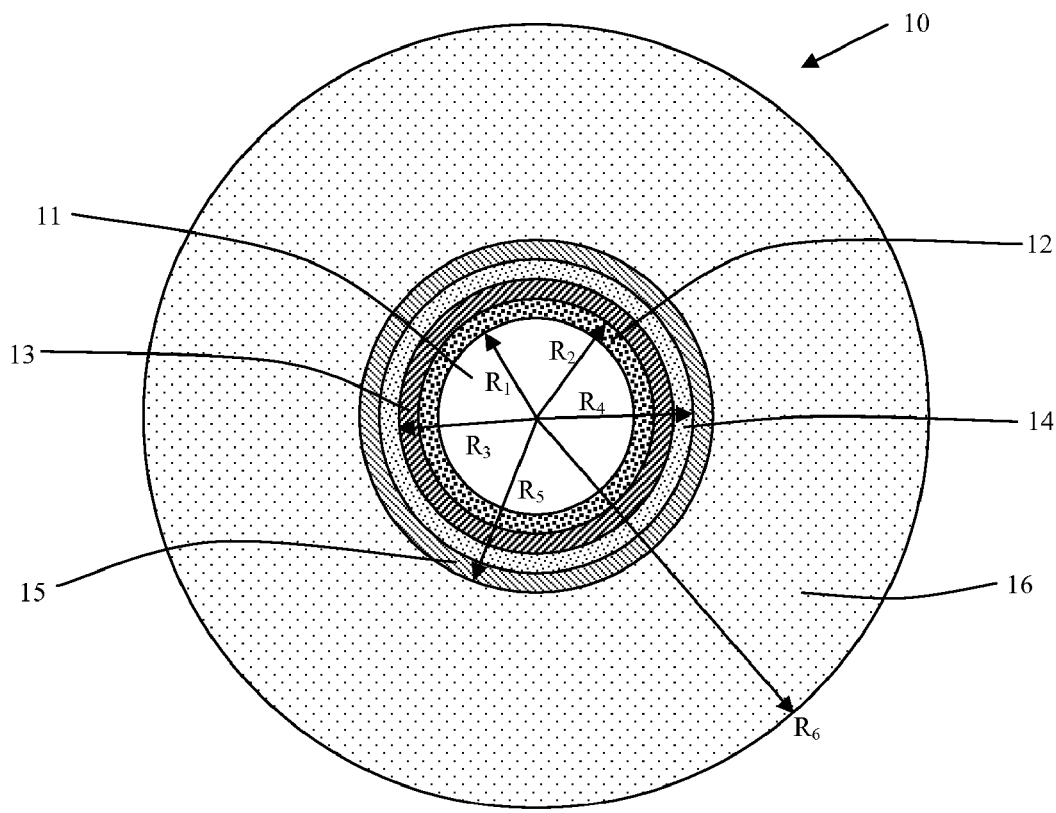
FIG. 2 depicts the cross-section (not to scale) of an exemplary fiber according to the present invention.

With reference to FIG. 2, the fiber 10 of the invention has a central core 11, a first intermediate inner cladding 12, and a first depressed inner cladding 13. The fiber also has a second intermediate inner cladding 14 and a second depressed inner cladding 15. By depressed inner cladding, it is meant that a radial portion of the fiber 10 has a refractive index less than the index of the outer optical cladding 16. The first depressed inner cladding 13 has an index difference with the outer optical cladding 16 that is typically less than $-5 \times 10^{-3}$ but that may reach $-15 \times 10^{-3}$. The second depressed inner cladding 15 has a smaller index difference with the outer cladding 16 than with the first depressed inner cladding 13; this index difference is typically between $-0.3 \times 10^{-3}$ and $-3 \times 10^{-3}$.

As will be appreciated by those having ordinary skill in the art, FIG. 2 is a schematic representation of an exemplary fiber. FIG. 2 is intended to depict the relative positions of the central core 11 and the respective cladding layers 11-16 within the fiber 1. Accordingly, the central core 11 and cladding layers 11-16 are not necessarily drawn to scale (e.g., the outer cladding 16).

Figure 3:
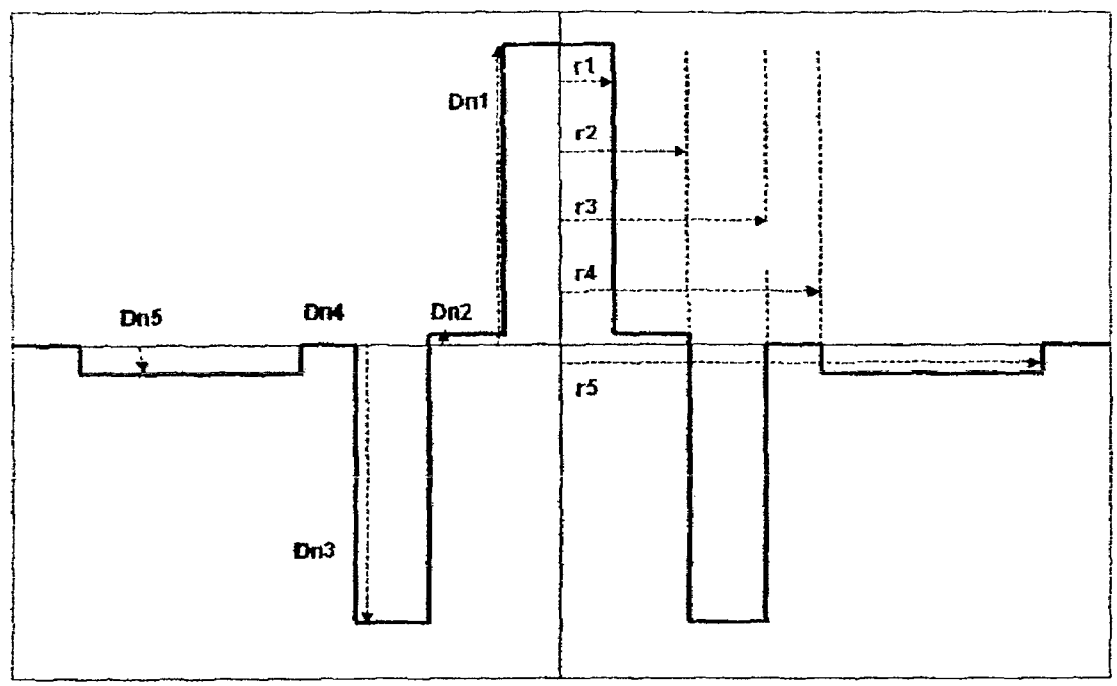
FIG. 3 depicts the set profile of a step-index fiber according to one embodiment of the invention.

FIG. 3 illustrates an index profile for a transmission fiber according to the invention. The illustrated profile is a set profile (i.e., representative of the theoretical profile of the fiber). Fiber actually obtained after fiber drawing of a preform may have a slightly different profile.

The step-index transmission fiber according to the invention includes a central core having an index difference ($Dn_1$) with an outer optical cladding, which acts as an optical cladding; a first intermediate inner cladding having an index difference ($Dn_2$) with the outer optical cladding; a first depressed inner cladding having a index difference ($Dn_3$) with the outer optical cladding; a second intermediate inner cladding having an index difference ($Dn_4$) with the outer optical cladding and a second depressed inner cladding having a index difference $Dn_5$ with the outer optical cladding. The index difference ($Dn_5$) is in absolute value less than the index difference ($Dn_3$). The refractive indexes in the central core, in the first and second depressed inner claddings, and in the first and second intermediate inner claddings are substantially constant over the whole of their widths. The set profile is a step-index fiber. The width of the core is defined by its radius ($r_1$) and the width of the claddings is defined by their respective outer radii, (i.e., $r_2$-$r_5$).

In order to define a set index profile for an optical fiber, the index value of the outer cladding is generally taken as a reference. FIG. 3 shows only a small part of the outer optical cladding and is intended to schematically illustrate the index differences in the core. The outer optical cladding of substantially constant index stretches out until the outside of the optical fiber. In other words, there is no further optical cladding having different refractive indices outside of the outer optical cladding. The index values for the central core, the depressed inner claddings, and the intermediate claddings are then shown as index differences ($Dn_{1,2,3,4,5}$). Generally, the outer optical cladding consists of silica, but this cladding may be doped in order to increase or reduce its refractive index, (e.g., to change the propagation characteristics of the signal).

The Table (below) provides typical limiting values for the radii and the index differences that allow a fiber profile to be achieved so that the fiber has reduced bending losses while meeting the criteria for optical propagation from the G.652 standard for transmission fibers. The r values correspond to set fiber profiles:

TABLE 1

|     | $r_1$ (μm) | $r_2$ (μm) | $r_3$ (μm) | $r_4$ (μm) | $r_5$ (μm) | $Dn_1$ ($10^{-3}$) | $Dn_1 - Dn_2$ ($10^{-3}$) | $Dn_3$ ($10^{-3}$) | $Dn_5$ ($10^{-3}$) |
|-----|------|------|------|------|------|------|------|------|------|
| min | 3.5  | 9.0  | 14.0 | 18.0 | 25.0 | 5.0  | 4.5  | −5   | −0.3 |
| max | 4.5  | 12.0 | 16.0 | 20.0 | 40.0 | 5.6  | 6.0  | −15  | −3   |

The presence of the second depressed inner cladding ($r_5$, $Dn_5$), which is less depressed than the first depressed inner cladding, provides a limitation of the presence of leakage modes capable of propagating along the fiber and inducing an increase in the effective cut-off wavelength. By the presence of the first intermediate inner cladding ($r_2$, $Dn_2$), it is possible to ensure proper confinement of the single mode signal in the central core and to retain a mode field diameter compatible with the G.652 standard. By the presence of the first, deeply depressed inner cladding ($r_3$, $Dn_3$) the bending losses may be further reduced.

The transmission fiber according to the invention, having an index profile such as described previously, has reduced bending losses at wavelengths of use.

In particular, for a wavelength of 1625 nm, the fiber according to the invention has bending losses less than or equal to 0.1 dB for a winding of 100 turns around a spool with a bending radius of 20 mm; bending losses less than or equal to 0.1 dB for a winding of 10 turns around a spool with a bending radius of 15 mm; bending losses less than or equal to 0.2 dB for a winding of one turn around a spool with a bending radius of 10 mm; bending losses than or equal to 0.5 dB for a winding of one turn around a spool with a bending radius of 7.5 mm; bending losses than or equal to 1 dB for a winding of one turn around a spool with a bending radius of 5 mm.

The fiber according to the invention has even smaller bending losses at the wavelength of 1550 nm. In particular, for a wavelength of 1550 nm, the fiber according to the invention has bending losses less than or equal to 0.02 dB for a winding of 10 turns around a spool with a bending radius of 15 mm; bending losses less than or equal to 0.05 dB for a winding of one turn around a spool or a bending radius of 10 mm; bending losses less than or equal to 0.2 dB for a winding of one turn around a spool with a bending radius of 7.5 mm.

Further, the fiber according to the invention also has reduced microbending losses as compared with an SSMF. The microbending losses may be estimated with a so-called grid test (10 needles of 1.5 mm) at the wavelength of 1550 nm. This test uses a grid, formed with ten polished needles with a diameter of 1.5 mm, and spaced apart by 1 cm. The fiber passes through the grid over two passages, orthogonally to the axis of the needles. The fiber and the grid are pressed between two rigid plates covered with a layer of about 3 mm of high density polyethylene foam. The layers of the assembly (i.e., plates, grids, fiber) are positioned horizontally and the whole is covered with a 250 gram mass. With this test, the fiber according to the invention has microbending losses less than or equal to 0.025 dB at 1550 nm.

Microbending losses may also be estimated by the so-called fixed diameter drum method at a wavelength of 1625 nm. This method is described in the technical recommendation of the International Electrotechnical Commission from subcommittee 86A under reference IEC TR-62221. The diameter of the drum used is 60 cm; the drum is covered with extra fine sand paper. With this method, the fiber according to the invention has microbending losses less than or equal to 0.8 dB/km at 1625 nm.

Further, the fiber of the invention meets the criteria of the G.652 standard.

In particular, it has an effective cut-off wavelength ($\lambda_{Ceff}$) less than 1330 nm so that the cable cut-off wavelength ($\lambda_{CC}$) is less than 1260 nm, in compliance with the G.652 standard. The fiber according to the invention also has an MFD between 8.6 µm and 9.5 µm for a wavelength of 1310 nm.

The fiber according to the invention may also have a MAC ratio of up to about 8.2. The yield for manufacturing the fiber according to the invention is therefore better because there is no longer any requirement to exclusively select fibers with a MAC less than 7.9.

Figure 4:
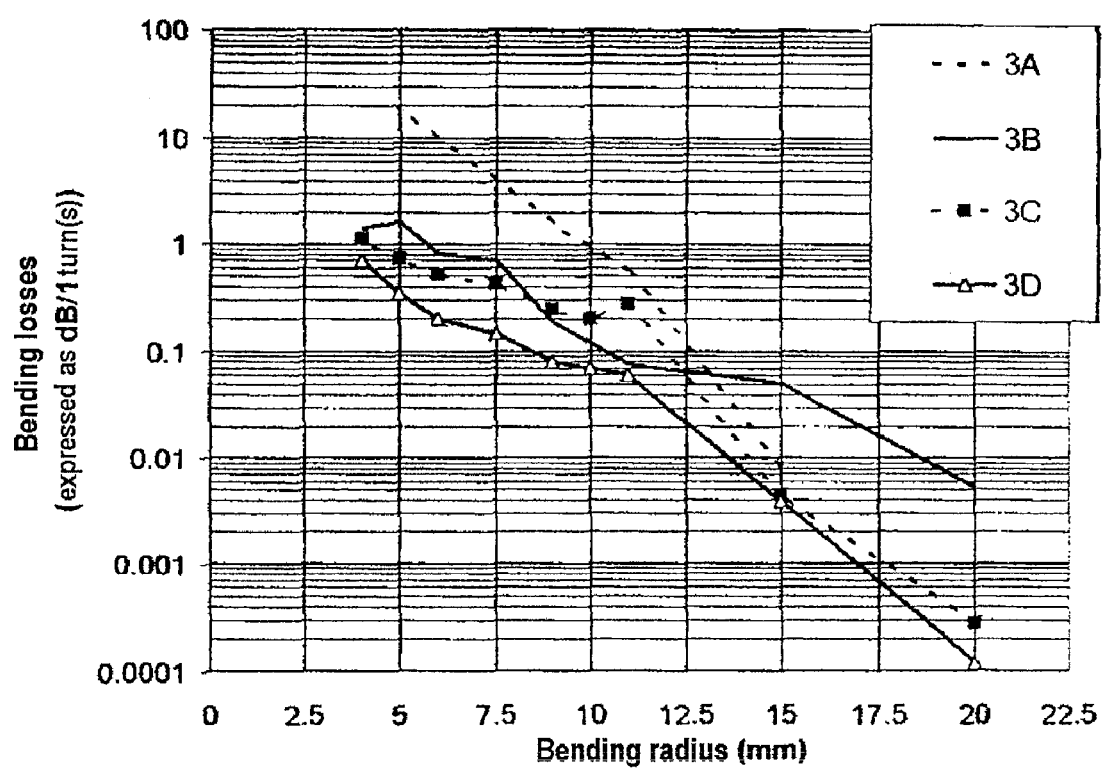
FIG. 4 depicts bending losses at the wavelength of 1625 nm versus the bending radius for fibers according to the present invention.

FIG. 4 graphically illustrates the bending losses at 1625 nm versus the bending radius for a SSMF, for a fiber identical with the invention but without the second depressed section, and for two fibers according to the invention.

A first curve (3A) shows the bending losses of a step-index SSMF. This fiber has a MAC of 8.1. It is noted that for small bending radii less than 7.5 mm, the bending losses considerably increase and exceed the value of 1 dB for a winding of one turn. Such a conventional fiber, currently used for long distance transmissions, is therefore not very suited for an FFTH or FTTC application as it may neither be wound in a miniature box of an optical module nor be subject to possible accidental bendings related to the installation without inducing strong optical losses.

A second curve (3B) shows the bending losses of a fiber similar to the invention but without any second depressed section. This fiber has a MAC of 8.2 and meets the criteria of the G.652 standard. It is noted that for small bending radii less than 7.5 mm, the bending losses are less than 1 dB/turn. On the other hand, the bending losses remain relatively significant for larger bending radii. Thus, the fiber has bending losses of the order of 0.5 dB for a winding of ten turns around a spool with a radius equal to 20 mm and of the order of 0.4 dB for a winding of 100 turns around a spool with a radius equal to 20 mm. These bending loss values for bending radii of 15 mm and 20 mm do not allow this fiber to be used in storage boxes with such winding radii.

A third curve (3C) shows the bending losses of a fiber according to the present invention. The fiber corresponding to this curve has a MAC of 8.2 and meets the criteria of the G.652 standard. It is noted that for small bending radii, less than 7.5 mm, the bending losses are of the order of 0.4 dB/turn, less than the preferred maximum value of 0.5 dB/turn; and for a bending radius of 10 mm, the fiber according to the invention has bending losses of the order of 0.2 dB/turn (i.e., the targeted upper limiting value). Also, for larger bending radii, bending losses remain limited; thus, for a bending radius of 15 mm, the fiber according to the invention has bending losses of the order of 0.04 dB/10 turns, less than the preferred maximum value of 0.1 dB/10 turns; and for a bending radius of 20 mm, the fiber according to the invention has bending losses of the order of 0.03 dB/100 turns, less than the preferred maximum value of 0.1 dB/100 turns.

A fourth curve (3D) shows the bending losses of another fiber according to the invention. The fiber corresponding to this curve has a MAC of 8.1 and meets the criteria of the G.652 standard. It is noted that for small bending radii less than 7.5 mm, the bending losses are of the order of 0.1 dB/turn, less than the preferred maximum value of 0.5 dB/turn; and for a bending radius of 10 mm, the fiber according to the invention has bending losses of the order of 0.07 dB/turn, less than the preferred maximum value of 0.2 dB/turn. Also, for larger bending radii, the bending losses remain limited; thus, for a bending radius of 15 mm, the fiber according to the invention has bending losses of the order of 0.04 dB/10 turns, less than the preferred maximum value of 0.1 dB/10 turns; and for a bending radius of 20 mm, the fiber according to the invention has bending losses of the order of 0.01 dB/100 turns, less than the preferred maximum value of 0.01 dB/100 turns.

The transmission fiber according to the invention may be made by fiber drawing of a preform having an index profile as described above.

An optical fiber may be made by drawing a preform on a fiber-drawing tower. A preform, for example, comprises a primary preform of a very high quality glass tube that makes up a portion of the cladding and core of the fiber. This primary preform is then re-loaded or sleeved in order to increase its diameter and to form a preform that may be used on a fiber-drawing tower. The scaled fiber-drawing operation includes placing the preform vertically in a tower and drawing a fiber strand from the end of the preform. For this, a high temperature is locally applied at one end of the preform until the silica is softened, the fiber-drawing rate and the temperature, which determine the diameter of the fiber, are monitored during the fiber drawing. The geometry of the preform should match the ratios of the refractive indexes and of the core and cladding diameters of the fiber so that the drawn fiber has the required profile.

Component deposition in the tube is commonly referred to by the expression "doping" (i.e., "impurities" are added to the silica in order to change its refractive index). For example, germanium (Ge) or phosphorus (P), either of which increases the refractive index of silica, is often used for doping the central core of the fiber. In contrast, fluorine (F) and boron (B) each lower the refractive index of silica. Fluorine, for instance, is often used for forming depressed claddings.

Making a preform with a highly depressed cladding is delicate. Indeed, fluorine is poorly incorporated in heated silica above a certain temperature whereas a high temperature is required for making glass.

By compromising between a high temperature required for making glass, and a low temperature promoting proper incorporation of fluorine, it is not possible to obtain indexes much less than that of silica.

Accordingly, it is preferred that the preform of the fiber according to the present invention are formed according to a plasma chemical vapor deposition (PCVD) technique because the reactions may be conducted by ionization of the reaction compounds at lower temperatures than in other techniques (e.g., CVD, VAD, OVD). Such a manufacturing technique is described in U.S. Pat. Nos. RE 30,635 and U.S. Pat. No. 4,314,833; it allows fluorine to be significantly incorporated into silica in order to form highly depressed claddings. However, the preform of the fiber according to the invention may also be made with CVD, VAD, or OVD techniques.

A silica tube, either pure or slightly doped with fluorine, is provided and mounted in a glasswork lathe. A gas mixture of glass forming precursors (doped or undoped) is injected in the tube. A plasma generated by microwaves traverses along the tube. In the plasma the glass forming precursors are reacted into glass (e.g., deposited on the internal surface in the tube).

The high reactivity of the dopants, generated by the microwave heating, enables a high concentration of dopants to be incorporated into the silica layers. In particular, fluorine is poorly incorporated in silica with local heating by a blow torch. With PCVD, a silica layer may be doped with a high concentration of fluorine in order to make up the first highly depressed cladding ($r_3$, $Dn_3$). The second slightly depressed inner cladding ($r_5$, $Dn_5$) may also be obtained by PCVD deposition as for the first highly depressed inner cladding. Alternatively, it may be made up with the actual silica tube, slightly doped with fluorine, or may be made during sleeving or reloading of the preform, such as by using a slightly fluorinated intermediate sleeving tube or by making a reloading portion with slightly fluorinated silica grains.

The transmission fiber according to the invention may be used in a transmitting or receiving module in an FTTH or FTTC system or in a high rate and long distance optical transmission cable, with reduced optical losses. The fiber of the invention is compatible with the marketed systems as it meets the G.652 standard. In particular, overlengths of the fiber according to the invention may be wound in storage boxes associated with optical modules of FTTH or FTTC systems, the fiber according to the invention may be wound with a bending radius less than 15 mm, or even less than 7.5 mm without inducing strong optical losses. The fiber according to the invention is also very suitable for supporting accidental bendings related to its installation at an individual's home, with bending radii ranging down to 5 mm.

Of course, the present invention is not limited to the described embodiments and to the uses described by way of example. In particular the fiber according to the invention may also be used in applications other than FTTH or FTTC.

In the specification and the figures, typical embodiments of the invention have been disclosed. Specific terms have been used only in a generic and descriptive sense, and not for purposes of limitation. The scope of the invention is set forth in the following claims.

The invention claimed is:

1. An optical transmission fiber, comprising:
  a central core having an index difference $Dn_1$ with an outer optical cladding;
  a first intermediate cladding having an index difference $Dn_2$ with the outer optical cladding, wherein the maximum index difference between the central core and the first intermediate cladding ($Dn_1$-$Dn_2$) is between about $4.5 \times 10^{-3}$ and $6.0 \times 10^{-3}$;
  a first depressed cladding having an index difference $Dn_3$ with the outer optical cladding that is less than or equal to about $-5 \times 10^{-3}$;
  a second intermediate cladding having an index difference $Dn_4$ with the outer optical cladding; and
  a second depressed cladding having an index difference $Dn_5$ with the outer optical cladding that, in absolute value, is less than the index difference $Dn_3$ of the first depressed cladding with the outer optical cladding;
  wherein, at a wavelength of 1625 nm, the optical transmission fiber has bending losses less than or equal to about 0.1 dB/10 turns for a bending radius of 15 mm and bending losses less than or equal to about 0.5 dB/turn for a bending radius of 7.5 mm.

2. The fiber according to claim 1, wherein the index difference $Dn_5$ between the second depressed cladding and the outer optical cladding is between about $-0.3 \times 10^{-3}$ and $-3 \times 10^{-3}$.

3. The fiber according to claim 1, wherein the central core has a radius $r_1$ between about 3.5 μm and 4.5 μm for an index difference with the outer optical cladding $Dn_1$ between about $5.0 \times 10^{-3}$ and $5.6 \times 10^{-3}$.

4. The fiber according to claim 1, wherein the first intermediate cladding has a radius $r_2$ between about 9 μm and 12 μm.

5. The fiber according to claim 1, wherein the first depressed cladding has a radius $r_3$ between about 14 μm and 16 μm.

6. The fiber according to claim 1, wherein the second intermediate cladding has an approximately zero index difference $Dn_4$ with the outer optical cladding.

7. The fiber according to claim 1, wherein the second intermediate cladding has a radius $r_4$ between about 18 μm and 20 μm.

8. The fiber according to claim 1, wherein the second depressed cladding has a radius $r_5$ between about 25 μm and 40 μm.

9. The fiber according to claim 1, wherein, at a wavelength of 1625 nm, the fiber has bending losses less than or equal to about 0.1 dB/100 turns for a bending radius of 20 mm.

10. The fiber according to claim 1, wherein, at a wavelength of 1625 nm, the fiber has bending losses less than or equal to about 0.2 dB for a bending radius of 10 mm.

11. The fiber according to claim 1, wherein, at a wavelength of 1625 nm, the fiber has bending losses less than or equal to about 1 dB/turn for a bending radius of 5 mm.

12. The fiber according to claim 1, wherein, up to a wavelength of 1625 nm, microbending losses according to the method of the fixed diameter drum are less than or equal to about 0.8 db/km.

13. The fiber according to claim 1, wherein the fiber has a cable cut-off wavelength of less than or equal to 1260 nm.

14. The fiber according to claim 1, wherein, at a wavelength of 1310 nm, the fiber has a mode field diameter (MFD) of between about 8.6 µm and 9.5 µm.

15. The fiber according to claim 1, wherein the fiber has a ratio (MAC) of mode field diameter at 1150 nm to effective cut-off wavelength (λCeff) of less than about 8.2.

16. The fiber according to claim 1, wherein the fiber has a zero chromatic dispersion wavelength ($\lambda_0$) of between 1300 nm and 1324 nm with a chromatic dispersion slope less than or equal to about 0.092 ps/nm²/km at the zero chromatic dispersion wavelength ($\lambda_0$).

17. The fiber according to claim 1, wherein the fiber is positioned within an optical module housing or a storage box housing.

18. An optical transmission fiber, comprising:
a central core having an index difference $Dn_1$ with an outer optical cladding that is between about $5.0 \times 10^{-3}$ and $5.6 \times 10^{-3}$;
a first intermediate cladding having an index difference $Dn_2$ with the outer optical cladding that is between about $-1.0 \times 10^{-3}$ and $1.1 \times 10^{-3}$, wherein the maximum index difference between the central core and the first intermediate cladding ($Dn_1-Dn_2$) is between about $4.5 \times 10^{-3}$ and $6.0 \times 10^{-3}$;
a first depressed cladding having an index difference $Dn_3$ with the outer optical cladding that is less than or equal to about $-5 \times 10^{-3}$;
a second intermediate cladding having an approximately zero index difference $Dn_4$ with the outer optical cladding; and
a second depressed cladding having an index difference $Dn_5$ with the outer optical cladding that (i) is between about $-0.3 \times 10^{-3}$ and $-3 \times 10^{-3}$ and (ii) in absolute value, is less than the index difference $Dn_3$ of the first depressed cladding with the outer optical cladding;
wherein, at a wavelength of 1625 nm, the optical transmission fiber has bending losses less than or equal to about 0.1 dB/10 turns for a bending radius of 15 mm and bending losses less than or equal to about 0.5 dB/turn for a bending radius of 7.5 mm.

19. An optical transmission fiber, comprising:
a central core having a radius $r_1$ between about 3.5 µm and 4.5 µm and an index difference $Dn_1$ with an outer optical cladding;
a first intermediate cladding having a radius $r_2$ between about 9 µm and 12 µm and an index difference $Dn_2$ with the outer optical cladding, wherein the maximum index difference between the central core and the first intermediate cladding ($Dn_1-Dn_2$) is between about $4.5 \times 10^{-3}$ and $6.0 \times 10^{-3}$;
a first depressed cladding having a radius $r_3$ between about 14 µm and 16 µm and an index difference $Dn_3$ with the outer optical cladding that is less than or equal to $-5 \times 10^{-3}$;
a second intermediate cladding having a radius $r_4$ between about 18 µm and 20 µm an index difference $Dn_4$ with the outer optical cladding; and
a second depressed cladding having a radius $r_5$ between about 25 µm and 40 µm and an index difference $Dn_5$ with the outer optical cladding that, in absolute value, is less than the index difference $Dn_3$ of the first depressed cladding with the outer optical cladding;
wherein, at a wavelength of 1625 nm, the optical transmission fiber has bending losses less than or equal to 0.1 dB/10 turns for a bending radius of 15 mm and bending losses less than or equal to 0.5 dB/turn for a bending radius of 7.5 mm.

* * * * *

UNITED STATES PATENT AND TRADEMARK OFFICE
CERTIFICATE OF CORRECTION

| | | |
|---|---|---|
| PATENT NO. | : 7,587,111 B2 | Page 1 of 1 |
| APPLICATION NO. | : 11/697994 | |
| DATED | : September 8, 2009 | |
| INVENTOR(S) | : Louis-Anne de Montmorillon et al. | |

It is certified that error appears in the above-identified patent and that said Letters Patent is hereby corrected as shown below:

In the Specification

Column 6, Line 15 reads "fiber +. Accordingly, the central core 11 and cladding layers"
and should read "fiber 10. Accordingly, the central core 11 and cladding layers"

In the Claims

Claim 15, Column 11, Line 21 reads "cut-off wavelength (λCeff) of less than about 8.2." and should read "cut-off wavelength ($\lambda_{Ceff}$) of less than about 8.2."

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,587,111 B2
APPLICATION NO. : 11/697994
DATED : September 8, 2009
INVENTOR(S) : Louis-Anne de Montmorillon et al.

It is certified that error appears in the above-identified patent and that said Letters Patent is hereby corrected as shown below:

Claim 15, Column 11, Line 20 reads "ratio (MAC) of mode field diameter at ~~1150~~ nm to effective" and should read "ratio (MAC) of mode field diameter at 1550 nm to effective"

Signed and Sealed this

Sixth Day of April, 2010

David J. Kappos
*Director of the United States Patent and Trademark Office*